United States Patent Office 2,938,018
Patented May 24, 1960

2,938,018

PRODUCTION OF HARD OLEFIN POLYMERS

Louis Schmerling, Riverside, Ill., assignor, by mesne assignments, to Universal Oil Products Company, Des Plaines, Ill., a corporation of Delaware No Drawing. Filed Nov. 22, 1957, Ser. No. 698,034

8 Claims. (Cl. 260—93.7)

This invention relates to a process for producing polymeric olefins of high molecular weight classified in the art as "hard" polymers and having plastic or resin-like properties which make the product particularly suitable for the manufacture of molded articles therefrom, such as containers, tubes, pipes and other pliable structures. More specifically, this invention concerns certain improvements in the manufacture of the foregoing high molecular weight polymeric olefins whereby a product of especially high melting point may be obtained by a process of polymerization effected at reaction conditions which are substantially less severe than polymerization processes heretofore utilized for the production of similar products, effected in the absence of the improved catalyst composition of this invention.

It has previously been found that monolefinic hydrocarbons, particularly ethylene, may be polymerized to form high molecular weight solid polymers by contacting the olefinic monomer with a catalyst consisting of titanium tetrachloride and aluminum, generally at relatively elevated temperatures and pressures. The resulting polymeric products have high molecular weights substantially in excess of 10,000 and melt at temperatures near the boiling point of water, generally within the range of from about 95° to about 150° C., the polymers thus having properties which permit them to be readily molded, while possessing a desirable relatively high melting point. Some of these polymeric products, however, formed in accordance with prior polymerization methods tend to undergo plastic deformation at temperatures below the boiling point of water. Such deformation occurs as a result of the tendency of the solid polymer to soften at substantially lower temperatures, and even though the product does not actually melt (i.e., liquefy) it does undergo changes in shape at temperatures below the boiling point of water, particularly when subjected to superheated steam at temperatures above about 100° C. Thus, in such operations as steam sterilization, pressure cooking, etc. the container or other article fabricated from such polyolefin plastics will gradually lose its original structure and design and its desirability for such uses consequently is substantially less. The present invention concerns certain improvements in prior methods of polymerization, one of said improvements involving the use of a catalyst for the reaction comprising a mixture of a titanium tetrahalide and aluminum to which mixture has been added a significant quantity of an oxide of molybdenum. In the presence of the resulting mixed catalyst the polymerization of the olefin monomer may be effected at reaction temperatures and pressures less severe than in the absence of the molybdenum oxide and the resulting product is a hard polymer having a higher melting point than the product obtained in the absence of the molybdenum oxide component of the present catalyst.

In one of its embodiments the present invention relates to a process for polymerizing an olefinic hydrocarbon containing up to about 12 carbon atoms which comprises contacting said hydrocarbon at a temperature of from about 25° to about 300° C. and at a superatmospheric pressure with a catalyst consisting of a mixture of an aluminum-containing metal, a halide of titanium and a solid oxide of molybdenum.

A more specific embodiment of the present invention relates to the above process, further characterized in that the olefinic hydrocarbon feed stock is ethylene, the catalyst consists of a mixture of finely divided aluminum metal, titanium tetrachloride, and finely powdered molybdenum trioxide, and polymerization is effected at a preferred temperature range of from about 80° to about 250° C. and at a superatmospheric pressure of at least 10 atmospheres.

The present polymeric products, particularly those formed by polymerizing a short-chain olefinic hydrocarbon, have molecular weights substantially in excess of about 10,000. The polymer products contain a single olefinic double bond per molecule, but because the polymer is of such high molecular weight, it may be considered essentially paraffinic in structure, since the single olefin bond in the large hydrocarbon molecule has little effect on the chemical or physical properties of the resultant polymer and particularly little effect on the sensitivity of the polymer to chemical attack.

The essential component of the charge stock to the present process is an olefinic hydrocarbon monomer containing up to about 12, and more preferably, from 2 to about 5 carbon atoms. The olefin may be charged to the process individually (that is, in the form of the substantially pure olefin monomer) or in admixture with other olefins or paraffinic hydrocarbons with which the olefin may be mixed as recovered from its source. Mono-olefins of low molecular weight, particularly ethylene, are the preferred olefinic charge stocks herein because of the more desirable physical properties of the resulting polymeric products produced therefrom (greater molecular weight, hardness, toughness, etc.). Furthermore, 1-alkenes such as 1-butene and 1-pentene are preferred over isomers in which the olefinic bond occurs on a more centrally located carbon atom, such as 2-butene and 2-pentene. The preferred olefinic feed stocks are made up entirely of mono-olefin monomers and more preferably contain only mono-olefins of the same type and of the same molecular weight, although light gas mixtures (for example, a mixture of $C_2$-$C_4$ olefins separated from the light gaseous product of a thermal cracking process) constitutes a readily available, highly effective charge stock to the present process, although such feed stocks may comprise a mixture of several components. Other utilizable feed stocks in the present process are the cyclo-olefins, such as cyclopentene and cyclohexene which may be charged as the individual monomer or in admixture with a low molecular weight aliphatic olefin, such as ethylene or propylene. The olefin monomer may also be a cyclic hydrocarbon-substituted alkene, such as 2-cyclohexylbutene-1, styrene, d-methylstyrene, allylbenzene, 3-phenyl-pentene-1, norbornylene, etc.

The catalyst utilized in the present process comprises a mixture of metallic aluminum and a titanium tetrahalide in contact with a solid oxide of molybdenum, the present mixture of catalyst ingredients coacting in combination within the reaction zone to result in the polymerization of the mono-olefin feed in such manner that each olefin monomer which condenses with a previously formed polymer adds on at the end of the polymer chain, resulting in the production of a long, straight-chain hydrocarbon molecule having an olefinic double bond at the end of the chain. The mechanism of the reaction and the manner in which such end-to-end polymerization occurs is not definitely established; however, it is believed to occur by way of an oxidation-reduction mechanism between the aluminum metal and the titanium tetrahalide, the molybdenum oxide ingredient of the catalyst composition having the effect of activating the centers of polymerization at a lower temperature and pressure (that is, at less severe reaction conditions) than a catalyst mixture in which the present molybdenum oxide ingredient is absent, and, furthermore, activating the monomer to such an extent that the polymerization proceeds for a longer period of time, resulting in the formation of polymers having greater molecular weight. Of the titanium tetrahalides utilizable in the present process, selected from the fluorides, chlorides and bromides, as well as the mixed halides, titanium tetrachloride is the most readily available, the least costly and generally preferred tetrahalide in the present polymerization process. Although any of the foregoing titanium tetrahalides may be utilized, they are not necessarily equivalent.

The aluminum component of the present catalyst mixture is preferably supplied in relatively pure form and in finely divided condition, such as powdered aluminum, commonly employed as a pigment for aluminum paint. It is believed that powdered aluminum offers an advantage because of the greater surface area of aluminum available to the other catalyst ingredients and the olefin monomer reactant provided by such finely divided particles; however, metallic aluminum in the form of larger particles, such as aluminum granules, aluminum chips and especially aluminum foil may also be used. It is further believed that the increased surface area of the powdered aluminum ingredient provides a greater number of active centers at which polymerization is initiated, the powdered form of the aluminum reducing the activation energy required to initiate the polymerization reaction. Although metallic aluminum in its substantially pure form is the particularly preferred form for use in the present process, aluminum containing alloys in which aluminum constitutes a predominate proportion, such as Raney Nickel, magnesium-aluminum alloys, iron-aluminum alloys, copper-aluminum alloys, etc. may also be employed in the present polymerization process, although not necessarily with the same results observed for aluminum in its substantially pure form.

The ingredient of the present catalyst composition herein referred to as an oxide of molybdenum may be supplied as the oxide in any of its various states of oxidation, such as molybdenum sesquioxide ($Mo_2O_3$), molybdenum dioxide ($MoO_2$), molybdenum trioxide ($MoO_3$) or in the form of an oxyhalide of molybdenum such as molybdenum oxybromide ($MoO_2Br_2$), molybdenum oxychloride ($MoOCl_4$, $MoO_2Cl_2$, $MoOCl_3$ and $Mo_2O_3Cl_5$). The oxide is also desirably supplied to the reaction vessel in the form of a finely divided powder which may be synthetically prepared from molybdenum salts by precipitation from their aqueous solutions, followed by drying the recovered precipitate, or the oxides may be derived from naturally-occurring minerals in admixture with inert ingredients, such as Chillagite ($3PbWO_4 \cdot PbMoO_4$), Wulfenite ($PbMoO_4$) and Ferrimolybdite ($Fe_2O_3 \cdot MoO_3$), the oxide being supplied to the reaction zone in a substantially anhydrous form in order to prevent deactivation of the other catalytic ingredients supplied to the process.

The above catalyst components, which in combination result in the production of the present high molecular weight "hard" polymers are supplied to the reaction zone in the following proportions: from about 1% to about 80% by weight of the mixture of titanium tetrahalide, from about 5% to about 90% by weight of the mixture of aluminum (calculated as pure metallic aluminum) and from about 5% to about 75% by weight of the mixture of the oxide of molybdenum. Particularly preferred mixtures of catalyst ingredients are those containing approximately equal proportions by weight of aluminum powder and the oxide of molybdenum and in which the titanium tetrahalide ingredient constitutes less than about 15 to 20% by weight of the entire mixture of three-component catalyst composition.

The polymerization process of this invention is desirably effected in the presence of an inert diluent which is selected from certain types of organic compounds which boil at sufficiently elevated temperatures to remain in essentially liquid condition at the temperature and pressure utilized in the process. Inert materials of this character include the saturated hydrocarbons (i.e., paraffins and perhydroaromatic hydrocarbons) particularly the normal paraffins of $C_5$ to about $C_{10}$ carbon atom content, preferably from $C_5$ to $C_8$ carbon atom content, such as n-hexane, cyclohexane, n-heptane and n-octane. Other classes of organic compounds utilizable herein as inert diluents are the halogen-substituted aliphatic hydrocarbons, such as dichloropropane and perfluorohexane, halogen-substituted aromatic hydrocarbons, such as chlorobenzene, p-chlorotoluene, any of the dichlorobenzenes, such as 1,4-dichlorobenzene, benzene hexachloride, etc., as well as numerous others selected from the above classes of compounds. Aromatic hydrocarbons, such as benzene or toluene might also be used but are generally not preferred because they are not inert and yield a substantial proportion of alkylated aromatic product.

The olefinic monomer charge stock in the present process is polymerized to form the so-called "hard" polymer product by contacting the charge stock containing the olefin monomer in the form of a pure olefin or in the form of a mixture of an olefin and a paraffin with the combined catalyst ingredients in the reaction vessel which may be operated at an elevated temperature and pressure, such as a pressure autoclave or other pressure resistant vessel. The reaction is effected at a super-atmospheric pressure, preferably of at least 10 atmospheres, although no substantial advantage is realized by operating the process at pressures in excess of about 3000 p.s.i., the preferred pressure in each instance being dependent upon the type of product desired and also upon the composition of the olefinic feed stock. Suitable reaction temperatures for the polymerization are within the range of from about room temperature (that is, at about 25° C.) to temperatures as high as about 300° C., preferably within the range of from about 80° to about 250° C.

It is usually desirable to carry out the polymerization reaction in the substantial absence of air or other reactive gases which may interfere with the polymerization reaction. Hydrogen may be present in the reaction zone without seriously affecting the course of the reaction or the yield of olefin polymer, although the polymeric product formed in the presence of hydrogen is generally of lower melting point than the product formed by polymerization in the absence of hydrogen.

The present process, although particularly adapted to batch-type methods of operation, may also be effected on an essentially continuous basis by distributing the solid component of the catalyst (that is, the metallic aluminum and the molybdenum oxide ingredient) in powdered or granular form or in layers in an elongated reactor through which a mixture of titanium tetrahalide and the olefinic charge stock are passed at the temperature and pressures required for effecting the polymerization reaction. Thus, the solid components of the catalyst composition may be deposited on the surface of a packing material, such as fire-brick, aluminum oxide chips, etc. contained within a tubular reaction vessel, or the molybdenum oxide may be placed in an aluminum tube (inside the tubular reaction vessel made of steel, for example, for reasons of strength) the olefinic feed stock and titanium tetrahalide in a diluent being passed through the reaction zone by charging the mixture at one end and withdrawing product, diluent, and unreacted charge stock from the other end. By such means a truly continuous process may be provided, since the desired polymer product may be continuously separated from the effluent stream of the reactor, the solid portion extracted with suitable solvents to remove the low molecular weight wax-like and grease polymers and the residue separated into desired solid fractions by fractional elution from the solid product. In a typical batch-type operation the catalyst, the diluent, if utilized, and olefin are charged into a pressure autoclave to the desired pressure and the autoclave thereafter heated to the reaction temperature as the mixture of catalyst and olefin is agitated, for example, by stirring. The polymeric product is thereafter recovered from the autoclave when the rate of polymerization is reduced to an uneconomical level. Before withdrawing the reaction mixture, one or more additional charges of mono-olefin may be introduced into the reaction vessel.

The product of this invention is generally a mixture of polymers having various molecular weights, usually averaging above about 10,000 and mostly above about 50,000, a major proportion of the polymer having molecular weights within the range of 100,000 and 500,000. Depending upon the reaction temperature and pressure and on the composition of the catalyst mixtures, the molecular weight of the olefinic polymer may be as high as several million. It is generally found that the highest molecular weight components of the polymer product are relatively insoluble in most organic solvents, such as aromatic hydrocarbons, while the lower molecular weight components of the polymer are relatively soluble in most organic solvents, including the halogenated hydrocarbons, such that the gross product of the polymerization may be separated by fractional elution of the various polymers from the mixture comprising the gross product, utilizing various solvents in the selective solvent fractionation of the raw product. Thus, the low molecular weight, wax-like and grease-like polymers may be dissolved from the gross product by contacting and mixing the latter with a paraffinic solvent, such as hexane at the boiling point of the hexane solvent. A higher molecular weight fraction may thereafter be separated from the gross product by Soxhlet extraction of the residue remaining after extraction of the product with a paraffinic solvent with an aromatic hydrocarbon such as benzene, toluene, or xylene. A fraction of still higher molecular weight may be separated from the residue of the preceding solvent fractionation by contacting the residue with a chlorinated hydrocarbon solvent such as p-chloro-toluene at the boiling point of the latter.

This invention is further illustrated with respect to several of its specific embodiments in the following examples which are presented for illustrative purposes only and not for purposes of defining the scope of the invention necessarily in accordance therewith.

*Example I*

A mixture of 10 grams each of finely divided aluminum powder and molybdenum trioxide and 2 grams of titanium tetrachloride was placed in the glass liner of an 850 cc. capacity autoclave. The autoclave was thereafter flushed with nitrogen to remove all traces of air from within the autoclave, followed by charging ethylene into the autoclave to 20 atmospheres pressure. The autoclave was then rotated as it was heated. The pressure rose to a maximum of 30 atmospheres at 98° C. and thereafter gradually dropped to 9 atmospheres as the temperature was raised to 130° C. during four hours. The final pressure was 1 atmosphere at room temperature. The contents of the autoclave were removed and 22 grams of amber-colored hard, solid polyethylene was recovered from the inside of the liner. The crude product softened at about 300° C., an unusually high softening point for a polyethylene. The crude product was subjected to extraction with hot toluene in a Soxhlet extractor for about three hours, and 4 grams of grayish-white granules which were soluble in boiling toluene but insoluble in toluene at room temperature, was recovered from the extract. This material softened at about 200° C. Further extraction of the crude residue in the Soxhlet thimble for an additional seven hours with hot toluene yielded 2 grams of white granules which softened at a temperature of about 150° to about 200° C. Both of the extracted polyethylenes yielded translucent sheets which were flexible and of excellent tensile strength when pressed in a Clark press at 160° C. and 10,000 p.s.i. pressure.

*Example II*

A catalyst mixture consisting of 5 grams of aluminum pigment, 5 grams of molybdenum trioxide and 2 grams of titanium tetrachloride in a glass liner is sealed into the autoclave utilized in Example I, the autoclave is charged with ethylene to an initial pressure of 40 atmospheres, followed by heating for three hours at a temperature of from about 92° to 100° C. at which temperature and pressure polymerization of ethylene occurs, the maximum pressure being 57 atmospheres. Thereafter, the autoclave is cooled to approximately room temperature at which temperature the pressure is approximately 10 atmospheres and without emptying the autoclave, it is again charged with ethylene to a pressure of 40 atmospheres, followed by heating and rotation of the autoclave until polymerization of the additional ethylene takes place. Folowing the same procedure, a total of five charges of ethylene are introduced into the autoclave, the accumulated product being removed after cooling the contents of the reactor. A total of 110 grams of solid polyethylene is recovered. Soxhlet extraction of the crude product yields fractions in the same melting range as the product of Example I above.

*Example III*

When the polymerization of ethylene is carried out in the autoclave under the conditions specified in Example II above except that the molybdenum oxide component of the catalyst is withheld from the catalyst mixture, the product which is obtained has a softening point of about 130° C. to 140° C. Furthermore, the yield of the higher melting point portion of the product is substantially less than the polyethylene product formed in the presence of molybdenum oxide.

*Example IV*

Utilizing the apparatus, the catalyst (5 grams aluminum pigment, 5 grams $MoO_3$, 2 grams $TiCl_4$) and at the reaction conditions specified in Example II, above, including the stepwise addition of the ethylene feed stock to the polymerization reactor, except that 50 cc. of n-heptane is added to the catalyst mixture charged into the autoclave prior to the introduction of the ethylene feed stock, a more readily controlled reaction occurs (i.e., the pressure and temperature rise within the autoclave after the introduction of ethylene feed stock is less precipitous) and the maximum temperature attained in the reaction mixture is about 20° C. less than the polymerization reaction of Example II, above. The product recovered consists of a diluent-soluble portion and a fraction insoluble in the n-heptane diluent. The heptane-insoluble residue is removed from the n-heptane extract and dried, the crude solid polyethylene weighing 120 grams. The crude product has a softening point of from 140–150° C. Extraction of the crude product with toluene yielded an extract softening at about 200° C. The extracted granules produce flexible, tough, transluscent sheets when pressed in a Clark press at 170° and at 10,000 p.s.i. pressure.

*Example V*

When molybdenum dioxide is utilized in place of molybdenum trioxide in the catalyst mixture in the autoclave and under the conditions of Example I, in the polymerization of ethylene, the yield of polymer is substantially the same and the proportion of high melting extract to lower melting extract is approximately the same.

*Example VI*

In the following run the polymerization of propylene utilizing the apparatus and in the presence of the catalyst employed in Example I results in a polymerization reaction initiating at a temperature of 80° C., the temperature attaining a peak value of about 140° C. The product consists of a mixture of both solid and liquid polymers, the proportion of solid polymers in the product being much less than in the product of Example I in which ethylene is utilized as the charge stock. The solid portion of the product extracted with toluene in a Soxhlet extractor yields a solid polymer, softening at a temperature of from about 120° to about 130° C.

The above results indicate that molybdenum oxide added to a polymerization catalyst consisting of powdered aluminum and titanium tetrahalide increases the proportion of high melting point polymer in the crude product.

I claim as my invention:

1. A process which comprises polymerizing an olefinic hydrocarbon containing from 2 to about 12 carbon atoms at a temperature of from about 25° to about 300° C. and at a superatmospheric pressure in the presence of a catalyst consisting essentially of a mixture of from about 5% to about 90% by weight of aluminum metal, from about 1% to about 80% by weight of titanium tetrachloride and from about 5% to about 75% by weight of a solid oxide of molybdenum.

2. The process of claim 1 further characterized in that said temperature is from about 80° to about 250° C.

3. The process of claim 1 further characterized in that said superatmospheric pressure is at least 10 atmospheres.

4. The process of claim 1 further characterized in that said olefinic hydrocarbon is an aliphatic mono-olefin containing from 2 to about 5 carbon atoms.

5. The process of claim 4 further characterized in that said mono-olefin is ethylene.

6. The process of claim 4 further characterized in that said mono-olefin is propylene.

7. The process of claim 1 further characterized in that said oxide of molybdenum is molybdenum trioxide.

8. The process of claim 1 further characterized in that said aluminum metal is in powdered form.

References Cited in the file of this patent

UNITED STATES PATENTS

| 2,726,234 | Field et al. | Dec. 6, 1955 |

FOREIGN PATENTS

| 874,215 | Germany | Apr. 20, 1953 |
| 1,132,506 | France | Nov. 5, 1956 |